United States Patent [19]

Rockenfeller et al.

[11] Patent Number: 5,079,928
[45] Date of Patent: Jan. 14, 1992

[54] DISCRETE CONSTANT PRESSURE STAGING OF SOLID-VAPOR COMPOUND REACTORS

[75] Inventors: Uwe Rockenfeller; Lance D. Kirol, both of Boulder City, Nev.

[73] Assignee: Rocky Research, Boulder City, Nev.

[21] Appl. No.: 712,081

[22] Filed: Jun. 7, 1991

Related U.S. Application Data

[63] Continuation of Ser. No. 376,426, Jul. 7, 1989, abandoned.

[51] Int. Cl.$^5$ ............................................. F25B 17/00
[52] U.S. Cl. ...................................... 62/106; 62/112; 62/480
[58] Field of Search .................. 62/480, 106, 112; 165/104.12

[56] References Cited

U.S. PATENT DOCUMENTS

| | | | |
|---|---|---|---|
| 1,932,492 | 10/1933 | Smith | 62/480 |
| 4,623,018 | 11/1986 | Takeshita et al. | 165/104.12 |
| 4,694,659 | 9/1987 | Shelton | 62/480 |
| 4,765,935 | 8/1988 | Paeye et al. | 62/480 |
| 4,823,864 | 4/1989 | Rockenfeller | 62/106 |
| 4,944,159 | 7/1990 | Crozat et al. | 62/112 |
| 4,976,117 | 12/1990 | Crozat et al. | 62/118 |

Primary Examiner—Henry A. Bennett
Assistant Examiner—John Sollecito
Attorney, Agent, or Firm—Jerry R. Seiler

[57] ABSTRACT

A method of transferring and recovering energy comprises placing in different reactors two or more different solid adsorbents having a gaseous reactant adsorbed thereon and each having a different gaseous reactant vapor pressure, in a first reaction cycle, pressurizing a first portion of the reactors at a first pressure to desorb the gaseous reactant in an endothermic reaction, and pressurizing a second portion of the reactors at a second pressure to adsorb the gaseous reactant in an exothermic reaction, and in a second reaction cycle, pressurizing the first portion of the reactors at the second pressure to adsorb the gaseous reactant in an exothermic reaction, and pressurizing the second portion of the reactors at the first pressure to desorb the gaseous reactant in an endothermic reaction, and directing at least a portion of the heat released during the exothermic reactions or at least a portion of heat adsorbed during the endothermic reactions to heat exchange means for energy recovery.

The invention includes apparatus having means for carrying out the process.

51 Claims, 6 Drawing Sheets

DISCRETE CONSTANT PRESSURE STAGING OF SOLID-VAPOR COMPOUND REACTORS

This is a continuation of application serial in 7/376,426, filed July 7, 1989, now abandoned.

BACKGROUND OF THE INVENTION

The use of compounds comprising solid-vapor compositions formed by adsorption of gas molecules on a solid adsorbent as heat pump working materials is known in the art. Heat pump systems using such materials have a number of advantages over other heat pumps for residential and commercial space conditioning, industrial heat pumping and refrigeration. Such advantages include higher temperature lift created by the solid-vapor media as compared to other sorption media thus eliminating the need for cooling towers or lift staging. Moreover, the apparatus used for the solid-vapor compound heat pumps require few, if any, moving parts, resulting in simple and reliable hardware. Additionally, such systems do not use the objectionable CFC's.

The solid-vapor compounds suitable for heat pumps include complex compounds which are materials which adsorb molecules of gas to form coordinative bonds in which the gaseous reactant coordinates via electron displacement with the solid adsorbent, commonly a solid metal inorganic salt. The adsorption/desorption process releases significant heat during adsorption and adsorbs energy during the desorption phase. Unlike most other sorption processes, the entire adsorption or desorption reactions may occur at constant temperature thus eliminating problems with hot and cold sorber ends. Useful gaseous reactants include water, ammonia, methanol, methane, ethane and the like. A number of such materials are described in co-pending applications serial Nos. 115,820, filed Nov. 2, 1987 and 262,016, filed Feb. 29, 1988. Such compounds and their uses described in the aforesaid co-pending applications are incorporated herein by reference.

Heat activated heat pumps consist of a heat engine subsystem which generates high pressure refrigerant vapor, essentially a thermal compressor, and a heat pump subsystem which uses high pressure refrigerant to produce cooling or heat pumping. The thermal compressor, heat pump, and their combination in a heat activated heat pump comprise useful thermodynamic systems which make advantageous use of solid-gas reactions. It is an object of the present invention to use such reactions to even greater advantage and efficiency. Moreover, thermal energy and cool storage systems may also be improved by using staging techniques of the present invention with respect to charge and discharge temperatures as well as energy density.

SUMMARY OF THE INVENTION

The present invention comprises a system utilizing methods and apparatus designed for making highly advantageous use of solid-vapor adsorption/desorption technology. In the reactions, solid reactants react with gaseous reactants to form compounds in which the gas is alternatively adsorbed and desorbed. In the process of the invention, a plurality or series of different compounds are selected based on the vapor pressure of the gaseous reactant. Utilizing a plurality of reactors or reaction chambers or sites in one or more reactors, each of which is charged with a different solid reactant, the materials are made to adsorb or desorb gaseous reactant at a given constant pressure by adjusting the pressure below or above the equilibrium vapor pressure of the gas. By selecting the appropriate solid in the series used to charge the different reactors in the apparatus, and by selecting an appropriate pressure for desorption reactions and typically a different pressure for adsorption reactions, the system can be made to function to take full advantage of discrete, stepwise adsorption and desorption of the different compounds to achieve thermal compression, heat pumping through mechanical or thermal activation and thermal energy storage. Heat is cascaded through all stages of the heat pump, desorbing gaseous reactant vapor at each stage. The system of the invention achieves improved efficiency using relatively simple hardware. These as well as other advantages will be evident from the following detailed description.

DETAILED DESCRIPTION

Heat Activated Heat Pump

As used herein, the term "compound" is intended to mean any reaction product formed by adsorption and desorption of a gaseous reactant on a solid reactant within the scope of the invention. In practicing the discrete staging of a constant pressure engine cycle according to the invention, a plurality of two or more different solid reactants are selected, and a different solid reactant is introduced into a different reactor or reaction site in the heat pump apparatus. The different compounds of a set, series or group of compounds used in the process are selected such that the temperature of adsorption of the low vapor pressure compound at low pressure, is higher than the desorption temperature of the next higher vapor pressure compound at high pressure. Each of the compounds of such sets or groups each also exhibit different vapor pressure curves, i.e., each has a different vapor pressure-temperature relationship, and which is independent of the concentration of the gaseous reactant. By selecting appropriate compounds and arranging them in the aforesaid sequence, the process cycle will be carried out so that the heat of adsorption is always at an adequate temperature to drive the next or subsequent desorption reaction in the cycle. Preferably the compounds of the series are selected so that none of the compounds in the same reactor have an additional coordination step at lower equilibrium temperature which may adsorb more reactant gas from the other compounds during temperature equilibrium or shut-down condition which would reduce cycle performance during intermittent operation. Moreover, masses of each compound are adjusted so that an approximately equal amount of heat is required to desorb each compound.

Specific reactants used to form compounds useful in the invention include metal oxides, hydrides, halides, carbonates, nitrites, nitrates, oxalates, sulfides and sulfates. Preferred metals for the inorganic salts are selected from alkali and alkaline earth metals, transition metals, aluminum, zinc, cadmium and tin. Preferred transition metals are manganese, iron, nickel, and cobalt. Hereinafter these reactants will be sometimes referred to as solids, salts or solid reactants.

Gaseous reactants which are adsorbed on the solids to form compounds which are especially useful in the processes of the invention are ammonia, water, methyl amine and methanol, ammonia being especially suitable because it is stable, and forms high energy complexes. However, hydrogen, carbon dioxide, sulfur dioxide, other lower alkanols, lower alkanes, particularly methane and ethane, pyridine, alkylamines, polyamines and phosphine may also be used. These gaseous reactants may also be referred to as refrigerants herein.

Figure 1:
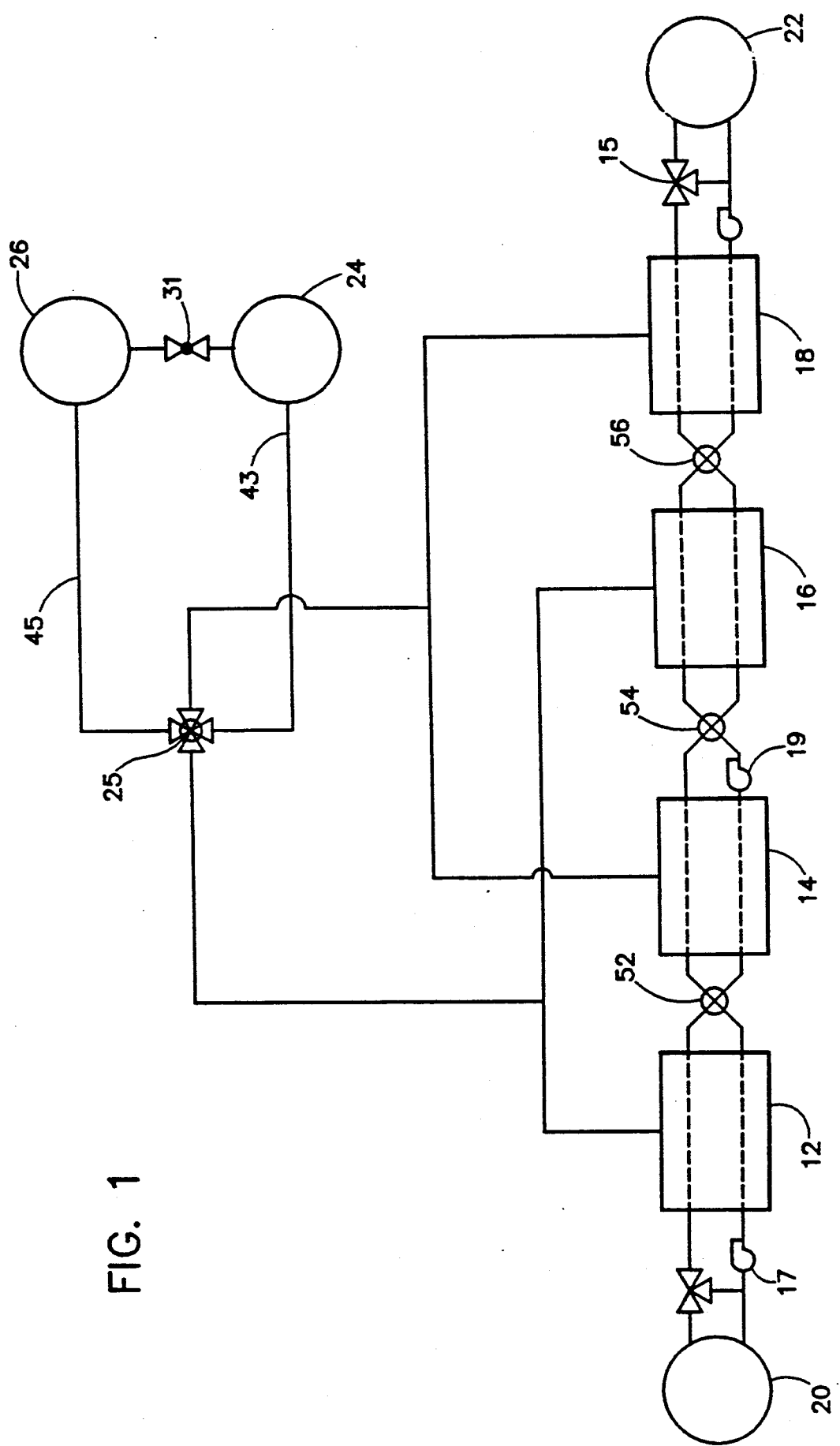
FIG. 1 is a schematic illustrating and example of an apparatus used in the system of the invention.

In a specific example of a set or series of compounds, to illustrate a system according to the invention, salts $MgBr_2$, $MgCl_2$, $SrBr_2$ and $SrCl_2$ are used in a heat pump consisting of four separate reaction vessels or separate heat-transfer regions in one or more reactors. The compounds comprise the ammonia ligand complex compound of the aforesaid salts with the $MgBr_2$ and $MgCl_2$ salts forming complexes containing 2 to 6 $NH_3$, $SrBr_2$ containing 2 to 8 $NH_3$ and $SrCl_2$ containing 1 to 8 $NH_3$. FIG. 1 illustrates schematically an example of an apparatus embodiment for carrying out the discrete constant pressure staged heat pump. The salts are charged to reactors 12, 14, 16 and 18, respectively, in successive ascending order of the complex compound ligand vapor pressure. Thus, first reactor 12 is charged with $MgBr_2$, reactor 14 with $MgCl_2$, reactor 16 with $SrBr_2$, and reactor 18 with $SrCl_2$. The apparatus includes a burner 20, heat exchanger 22, evaporator 24 and condenser 26 together with appropriate valves and conduits for directing ammonia gas from and to the reactors and the condenser and evaporator, and valves 52, 54 and 56 for directing heat transfer fluid between the reactors as well as pumps and heat exchange conduits for pumping heat transfer fluid within the system. In the first half-cycle, reactor 12 containing the high temperature salt $MgBr_2$ is at high pressure corresponding to (1) in FIG. 2 and reactor 16 containing $SrBr_2$ is also at high pressure corresponding to (3). Reactors 14 and 18 are at low pressure, reactor 18 containing $SrCl_2$ and reactor 14 containing $MgCl_2$, corresponding to (7) and (9), respectively.

During the first-half cycle, valves 52 and 56 are positioned so that pump 19 circulates heat transfer fluid through reactors 14 and 16, thereby transferring energy released during gas adsorption from reactor 14 to the solid reactant in reactor 16 to drive the desorption reaction occurring there. With the valve settings and proper positioning of valve 15, energy released during the adsorption in reactor 18 is rejected or recovered via heat exchanger 22. In this first half of the heat exchange cycle, valve 25 is also positioned for directing ammonia vapor from reactors 12 and 16 to condenser 26 and from evaporator 24 to reactors 14 and 18. Pump 17 circulates heat transfer fluid from burner 20 to reactor 12 to drive the desorption of the compound in that reactor.

Before start of the second half-cycle of the process, a short phase of heat recuperation and temperature shifting is required. The valve positions are charged so that reactors 12 and 14 are coupled, and reactors 16 and 18 are coupled, respectively, for heat transfer communication. Heat transfer fluid is pumped through each pair of coupled reactors to transfer heat from the hotter to the colder reactor. Thus, reactor 12 is cooled while reactor 14 is heated; reactor 16 is cooled while reactor 18 is heated. This terminates the recuperative and temperature adjustment phase in preparation for the second half-cycle.

In the second half-cycle burner 20 is not used. Solid reactant in reactor 14 desorbs its gaseous reactant, driven by heat from the adsorption reaction in reactor 12. The compound in reactor 18 desorbs, driven by heat released from adsorption of the compound in reactor 16. Ammonia from the desorption reactions is directed to the condenser 26, and ammonia for the adsorption reactions is obtained from evaporator 24.

At the conclusion of the second half-cycle, another phase of recuperation and temperature adjustment as previously described readies the system for repeating the first half-cycle. In this example, using the aforesaid adsorption and desorption pressures and temperatures, the condensation temperature in condenser 26 is 315° K and in the evaporator, 275° K. The apparatus of FIG. 1 could also be modified with reactors 12 and 16 combined and reactors 14 and 18 combined in single vessels, respectively, since both reactors in either pair are always at the same pressure. All four compounds may be located in a single reactor, with the heat pump consisting of two such reactors, each operating at alternately high and low pressure.

Figure 2:
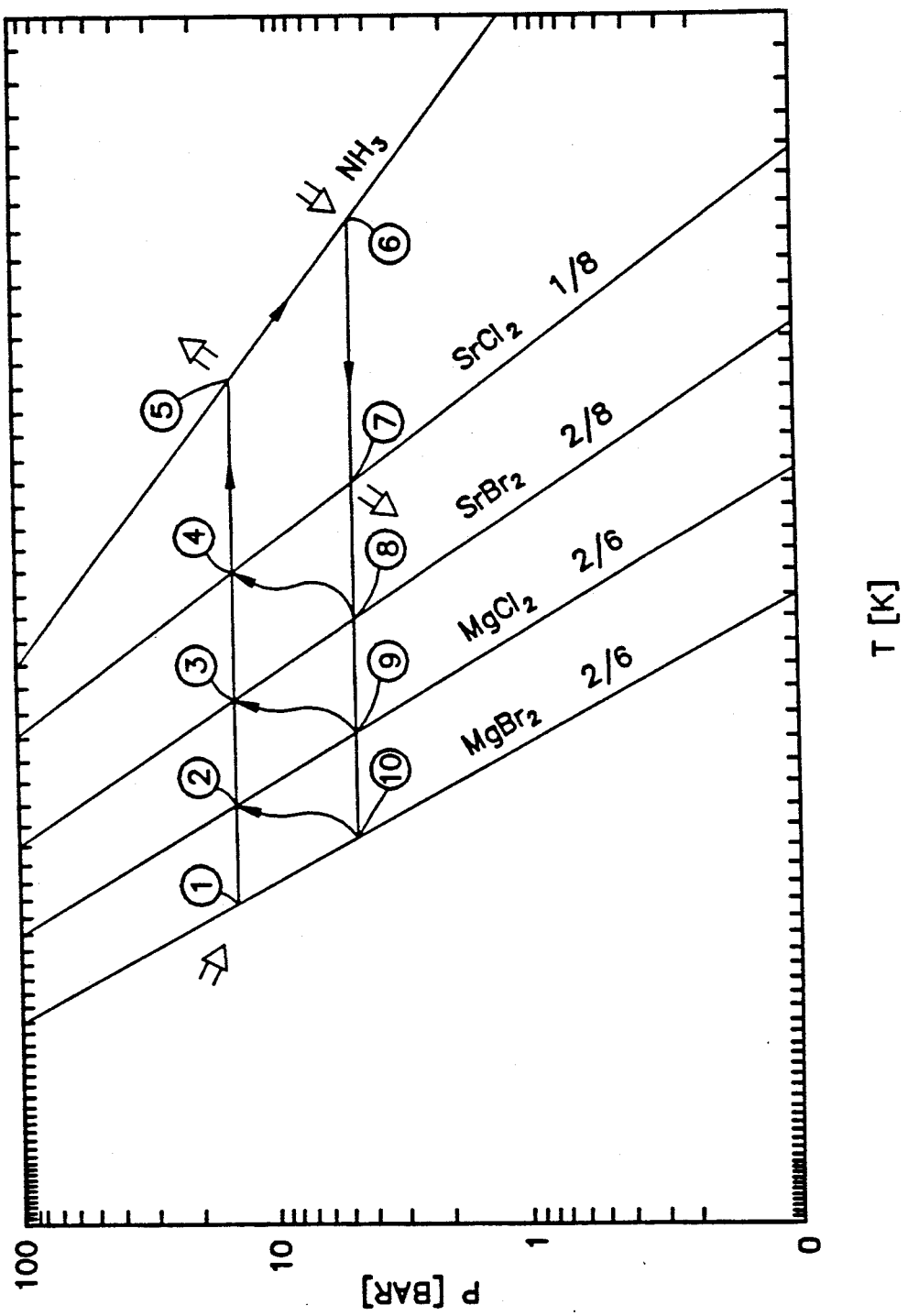
FIG. 2 is a phase diagram illustrating a preferred embodiment the process of the invention carried out in the apparatus illustrated in FIG. 1.

Points 1-10 on the phase diagram of FIG. 2 illustrate the discrete staging that occurs in the reactors at the various temperatures and pressures as the ammonia ligand is alternately adsorbed and desorbed on the metal salts. At (1), prime heat from a source, for example burner 20 in FIG. 1, is used to partially or fully desorb $MgBr_2$ $6NH_3$ to $MgBr_2$ $2NH_3$. At (2), $MgCl_2$ $6NH_3$ is desorbed, at (3) $SrBr_2$ $8NH_3$ is desorbed, and at (4) $SrCl_2$ $8NH_3$ is desorbed. Gaseous reactant from the desorptions is condensed at (5) releasing heat, which may be recovered by any heat exchange means. The desorption reactions are carried out at a single pressure, 16.28 Bar.

The adsorption phase of the reaction is carried out at a lower pressure, 4.6 Bar with the aforesaid complexes, ammonia being directed to a lower pressure and evaporated at (6), absorbing heat. The ammonia vapor is then adsorbed into the four complex compounds at points (7), (8), (9) and (10). Heat released from the adsorption at (7) is rejected externally by heat exchanger 22 (FIG. 1), and heat from the other three adsorption reactions is used to drive the desorption reactions illustrated by the arrows between points (8) and (4), (9) and (3), and (10) and (2), respectively.

At the end of this portion of the cycle, the process is reversed so that, for example, complex at (1), now desorbed, is lowered in temperature and pressure to the conditions at (10) for adsorption. The complex at (10), which is now adsorbed, is increased in temperature and pressure to the conditions of (1), as are complex compounds in the other three reactors. Thus, the output from the cycle, depending on the intended application, may be used for cooling obtained from ammonia evaporation at (6), or the heat released from the process at (5) and (7) in a quasi-continuous mode.

Referring again to the example using four aforesaid complex compounds and points (1)–(10) in FIG. 2, the following table illustrates the different temperatures and pressures at which the complex compounds adsorb and desorb the ammonia ligand.

TABLE I

| $NH_3$ | Desorb (16.28 Bar) | | Adsorb (4.6 Bar) | |
|---|---|---|---|---|
| | Temp. °K. | | | |
| $MgBr_2.2/6$ | (1) | 604 | 544 | (10) |
| $MgCl_2.2/6$ | (2) | 495 | 449 | (9) |
| $SrBr_2.2/8$ | (3) | 432 | 391 | (8) |
| $SrCl_2.1/8$ | (4) | 374 | 342 | (7) |

From this example of a set or series of complex compounds it is shown that the temperature of adsorption of the low vapor pressure salt, at the low adsorbing pressure, is higher than the desorption temperature of the next higher vapor pressure salt. Observing FIG. 2, this critical feature will be evident from the complex compounds in the table noting the points of the cycle stages which correspond to the phase diagram numbers.

Figure 3:
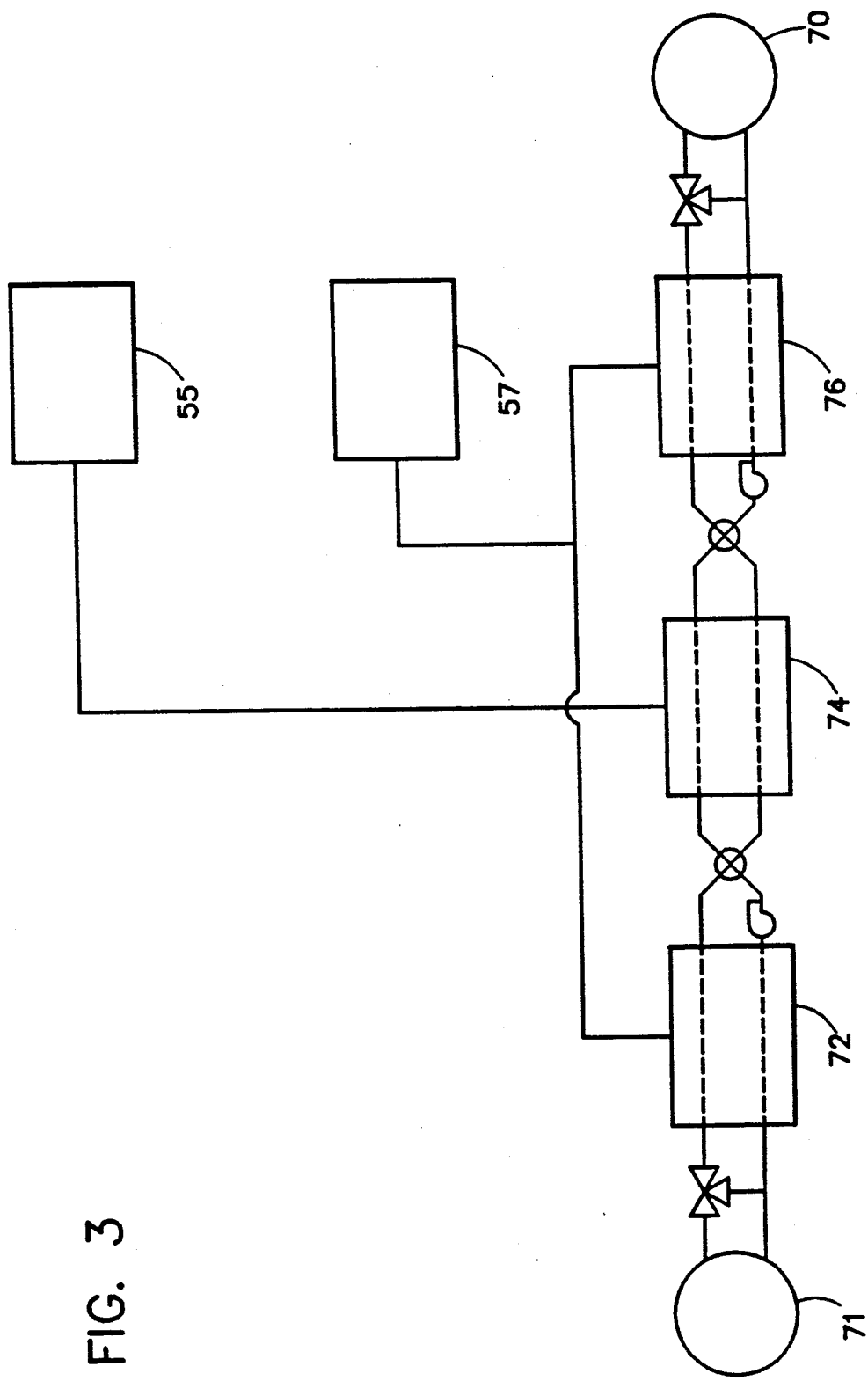
FIG. 3 illustrates another apparatus embodiment for carrying out the method according to the invention.

Referring to FIG. 3, a three reactor apparatus utilizing a system according to the invention is shown. Examples of suitable compounds for use in such an apparatus for carrying out a discrete constant pressure adsorption/desorption process is shown in Tables II and III together with the desorption and adsorption temperatures and pressures. The compounds are listed in their ascending order from the lowest to the highest ammonia vapor pressure. In the example of FIG. 3, instead of using an evaporator and condenser illustrated in FIG. 1, NaBr or $BaCl_2$ in reactors 55 and 57 is used to desorb and adsorb the ammonia from and to reactors 72, 74 and 76. In this example, in each of the respective reactors, a different one of the salts forming the complex compounds of Table II or III is placed in each of the reactors, so that the compound having the lowest gas vapor pressure is in first reactor 72, and compounds of successively higher gaseous reactant vapor pressures in the successive reactors 74 and 76. Again, this successive positioning of compounds based on ascending vapor pressures in corresponding successive reactors or reaction regions as illustrated in the drawing and previously described, is critical to the invention.

Burner 71 and heat exchanger 70 are utilized in a manner as previously described in FIG. 1 (for burner 20 and heat exchanger 22). Heat is also exchanged externally with heat transfer fluid flowing through reactors 55 and 57. These reactors alternatively provide heating and cooling. During one half-cycle, reactor 57 provides cooling while 55 is heating, and in the other half-cycle 55 is cooling and 57 is heating. The advantages of using the sodium bromide, or other solid reactant, for adsorbing/desorbing the gaseous reactant as opposed to the condenser/evaporator equipment include (1) higher energy density in the adsorption/desorption reactions as compared to evaporation and condensation of the gas, resulting in higher coefficients of performance and less system mass, and (2) the ability to reject heat at high temperature with lower system pressure than would be required using refrigerant condensation. For continuous cooling two or more subsystems can be operated in a phase shifted mode.

TABLE II

| $NH_3$ | Desorb (16.28 Bar) | Adsorb (4.6 Bar) |
|---|---|---|
| | Temp. °K. | |
| $MgBr_2.2/6$ | 604 | 544 |
| $CoCl_2.2/6$ | 495 | 449 |
| $SrCl_2.1/8$ | 374 | 342 |

TABLE III

| $NH_3$ | Desorb (7.31 Bar) | Adsorb (1.44 Bar) |
|---|---|---|
| | Temp. °K. | |
| $MgBr_2.2/6$ | 562 | 502 |
| $CoCl_2.2/6$ | 461 | 416 |
| $CaCl_2.2/4$ | 356 | 320 |

Thermal Compressor

The process and system of the invention may also be used as a thermal compressor, which is a subsystem of a heat activated heat pump. For example referring to FIG. 1, by removing condenser 26, evaporator 24, and valve 31, the resulting sub-system apparatus is a thermally activated compressor which receives low pressure vapor through conduit 43 and delivers high pressure vapor through conduit 45. Such a thermal compressor may be used as a less expensive alternative to an electrically driven compressor for obtaining pressurized gaseous reactants. Thus, constant pressure staging of appropriate compounds can provide efficient thermal compression of any gaseous reactant, such as water, ammonia, carbon dioxide, sulfur dioxide, methanol and other lower alkanols, alkylamines, polyamines, and phosphine. Hydrogen can also be compressed by use of hydrides in the reactors in place of complex compounds while carbon dioxide can be used with metal oxide/metal carbonate reactants, and water can be used with metal oxide/metal hydroxide or complex compound reactants. Such thermal compression using a process of the present invention is more efficient than conventional thermal compressors because heat is cascaded through several stages and high pressure vapor is generated at each stage.

Heat Pumps Activated by Mechanical Work or Pressure

Figure 4:
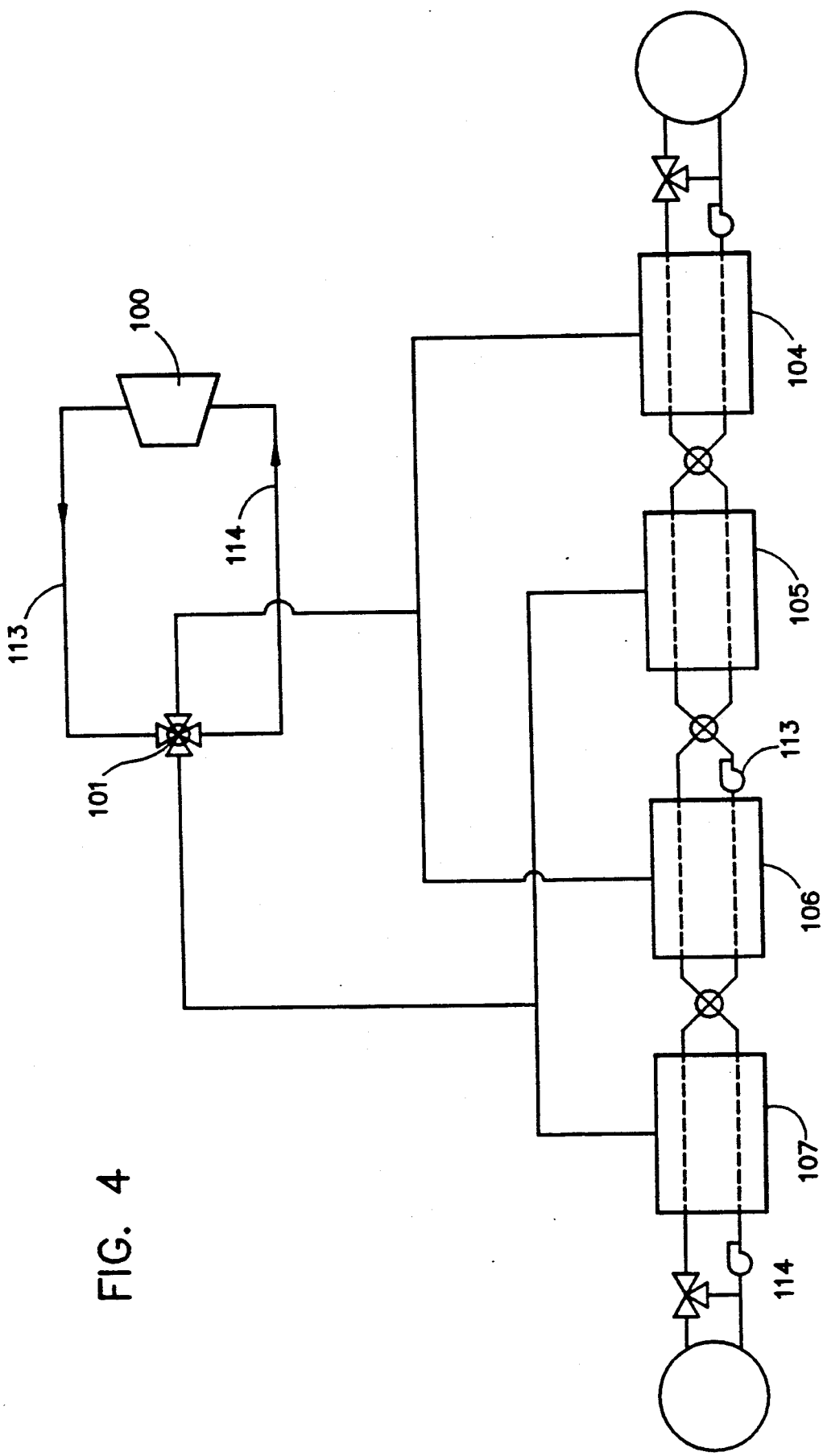
FIG. 4 illustrates a mechanically activated heat pump apparatus used in the system of the invention.
Figure 5:
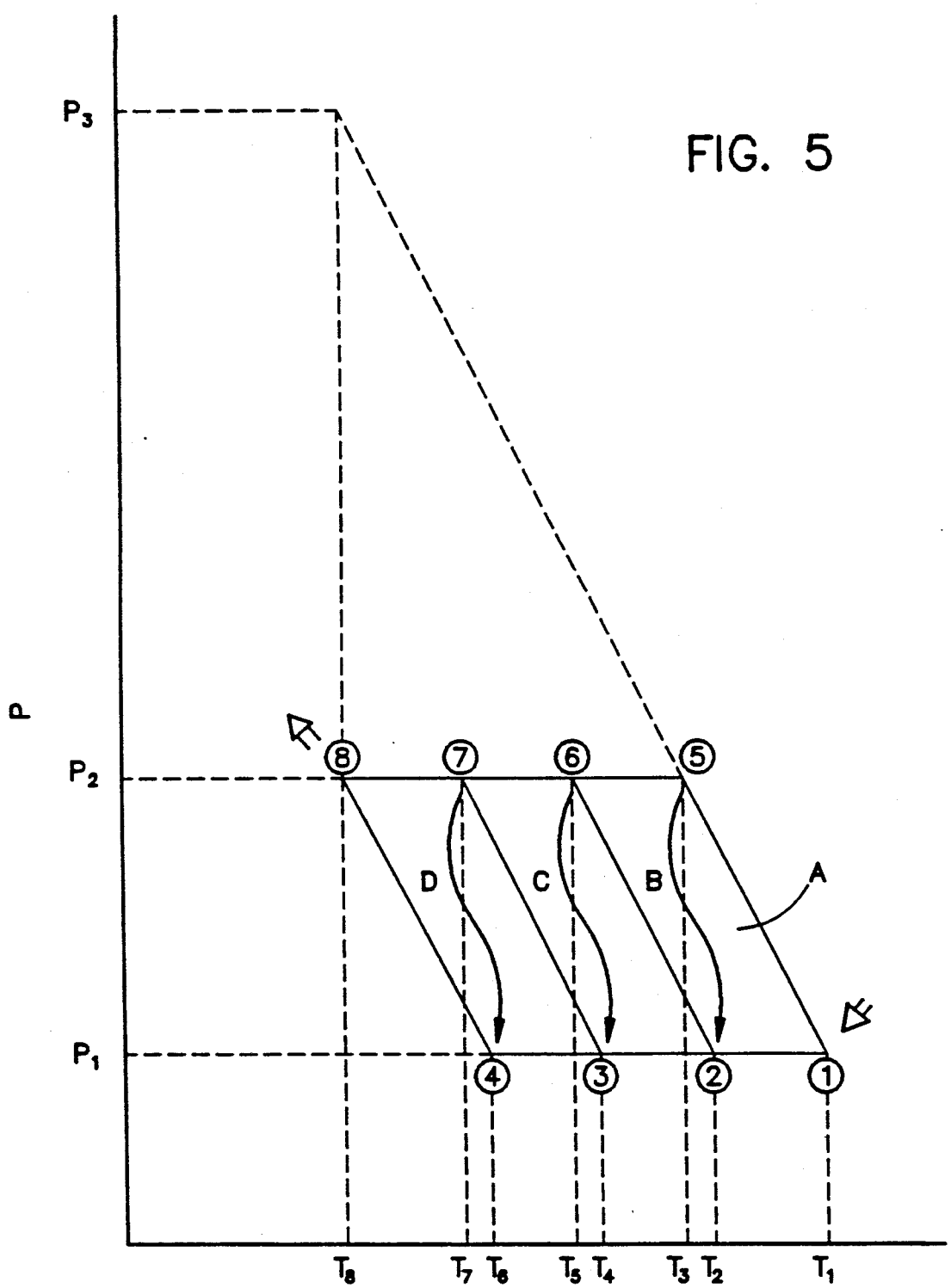
FIG. 5 is a phase diagram illustrating a preferred embodiment of the process of the invention carried out in the apparatus illustrated in FIG. 4.

The constant pressure staging process of the invention may also be used in a heat pump which receives high pressure refrigerant vapor, discharges low pressure vapor, and produces cooling or heating. The high pressure refrigerant vapor can be provided by a mechanical compressor, thermal compressor, for example a constant pressure staged thermal compressor described above, or other source. The constant pressure staged heat pump is most advantageous when coupled with a mechanical compressor, because efficiency and reliability of mechanical compressors increase as compression ratio is decreased. Such an apparatus is illustrated in FIG. 4, and process conditions shown in FIG. 5. Compounds A, B, C and D are contained in reactors 104, 105, 106, and 107, respectively. During the first half-cycle, valve 101 is positioned such that high pressure vapor delivered through conduit 113 from compressor 100 is directed to reactors 104 and 106. Compound A in reactor 104 and complex C in reactor 106 are initially at high pressure P2 in the first half-cycle, and B and D in reactors 105 and 107 are at low pressure P1. Compound A adsorbs at high pressure point (5), releasing heat which drives desorption of compound B at low pressure point (2); compound C adsorbs at high pressure (7), releasing heat which drives desorption of compound D at low pressure (4). Vapor generated during desorption of compounds B and D is routed through valve 101 and conduit 114 to the inlet (low pressure) side of compressor 100.

During the second half-cycle, compounds A and C are at low pressure, and compounds B and D are at high pressure. Valve 101 is positioned to direct high pressure vapor from the compressor to compounds B and D in vessels 105 and 107, and to direct low pressure vapor from reactors 104 and 106 to the inlet side of compressor 100. During this half-cycle, compound, A desorbs at low pressure (1) producing refrigeration at temperature T1. Compound B adsorbs at high pressure (6), and heat released is used to drive the desorption of complex C at low pressure (3). Compound D desorbs at high pressure (8), delivering heat at temperature T8. Cooling at T1, heating at T8, or both, are the useful products of the heat pump operation. Continuous cooling or heating is provided by utilizing two or more banks of reactors, operating out of phase.

The number of compounds used can be two or greater. The lowest temperature compound (A in FIG. 5) may be replaced by evaporation and condensation of the gaseous reactant. The utility and improvement of the invention is evident from FIG. 5. Heat is lifted from temperature T1 to T8 while operating between pressures P1 and P2. Use of only compound A (or refrigerant condensation/evaporation) would only lift heat to T3 at the same pressures. A peak pressure of P3, several orders of magnitude higher than P2, would be required to obtain temperature lift to T8.

Compounds and operating conditions are selected such that the high pressure compounds always adsorb at sufficiently high temperature so heat released can be used to drive the next description. Specifically, referring to FIG. 5, T3 must be greater than T2, T5 greater than T4, and T7 greater than T6. Thus, in this embodiment, the successive compounds in the set or group are selected so that the higher temperature adsorbing compound, i.e., the compound that adsorbs at a higher temperature, at high pressure, has an adsorption temperature higher than the desorption temperature of the next succeeding, compound at low pressure. The compounds are located into successive reactors in this ascending adsorption temperature order. Selection of such compounds and high and low reaction pressures will be understood by those skilled in the art. Although the reactions described and shown herein will normally involve the next successive higher vapor pressure compound, in certain instances, such as heat pump operations under extreme temperature conditions, or multiple temperature level operations, it may be desirable to skip one or more compounds in any specific cycle.

The discrete constant pressure staging cycle process disclosed herein has a number of advantages over previously known heat pump cycles, thermal compressors, and thermal storage. As a heat activated heat pump or thermal compressor, the process of the present invention delivers high coefficient performance, and takes thermodynamic advantage of high driving temperatures, limited only by the stability of the lowest vapor pressure compounds. Multiple staging is performed within the hardware of single staged systems, and results in lower cost than is possible with other two or multi-stage cycles. Between half-cycles, the complex in each stage is heated by drawing heat from the next hotter stage, making regeneration of sensible heat efficient and simple, and improving cycle efficiency as compared to other solid-vapor heat pumps and thermal compressors. Operating as a mechanical or thermal compressor heat pump, the system of the invention makes high temperature lift and low pressure ratios possible. Although separate reactors are shown in the drawings for the different reaction sites the reactions may be carried out in reaction sites or chambers of a single reactor. Thus, as used herein, the term reactors is intended to include one or more reaction sites or chambers in a single reactor as well as multiple reactors.

Figure 6:
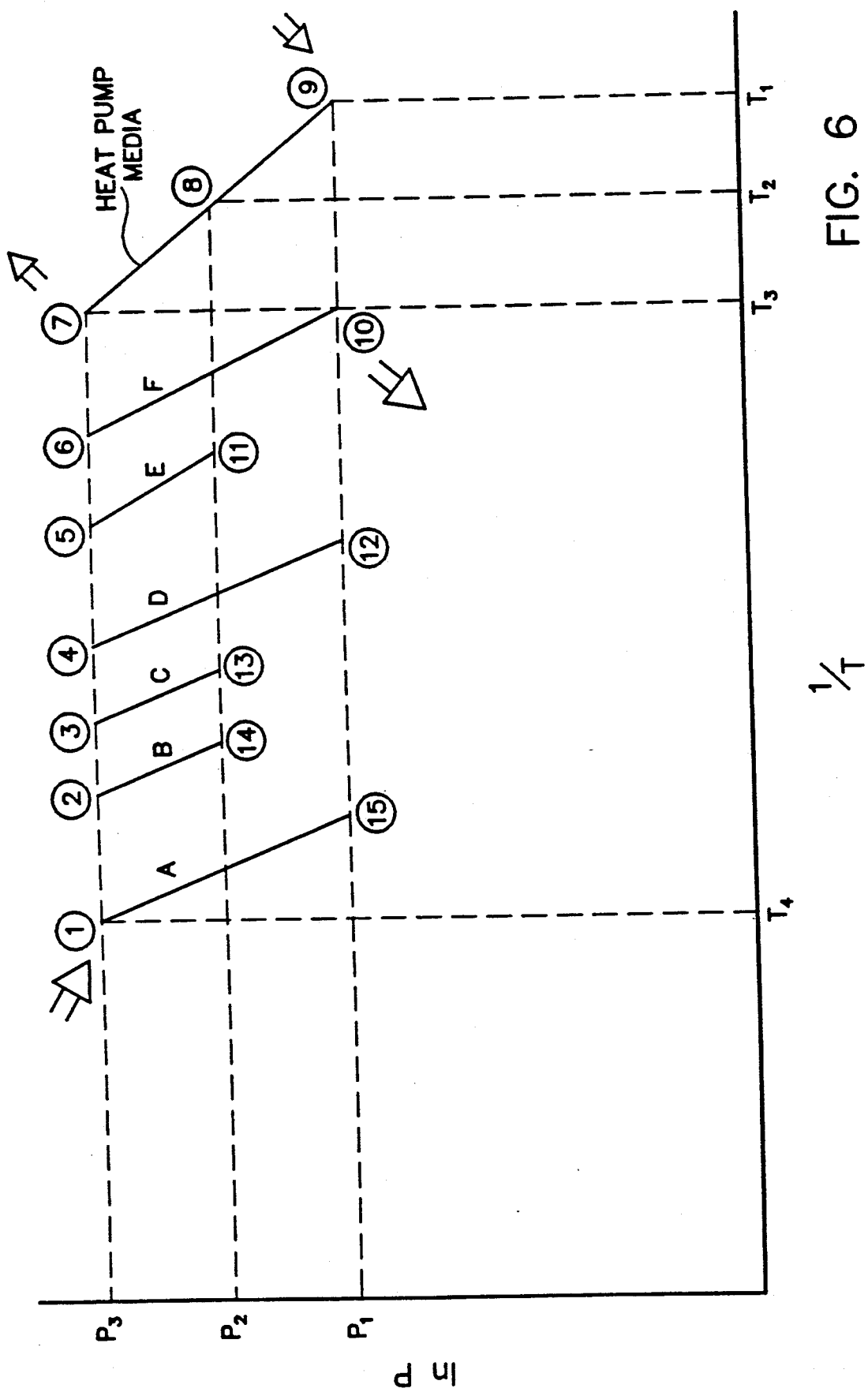
FIG. 6 is a phase diagram illustrating another embodiment of the invention using constant pressure staging at different pressure and temperature levels.

Constant pressure staging of the invention can also be used to receive or deliver vapor at more than one pressure level. This capability allows for multiple temperature refrigeration, multiple temperature heat delivery from a heat pump, thermal storage at different temperature levels, or thermal compression simultaneously operating at more than one compression ratio. The number of different pressure ratios possible is equal to the number of stages in the cycle. FIG. 6 is a phase diagram illustrating an example of a six stage cycle for providing refrigeration at two different temperatures. Refrigeration temperatures T1 and T2 establish system pressures P1 and P2, according to the vapor pressure function of the heat pump working media, which can be a pure refrigerant undergoing phase change, or refrigerant involved in any sorption process. Heat rejection temperature T3 at pressure P3 is also on the heat pump media vapor pressure line. The cycle operates in the manner as described previously. Heat is input at a temperature T4, which is relatively high compared to T3. Energy input at state point (1) drives desorption of compound A. Adsorption at point (15) releases heat to drive desorption at point (2), and so on for compounds B-F. Heat input at point (1) is effectively cascaded through the cycle, in the state point sequence of 1-15-2-14-3-13-4-12-5-11-6-10. Heat release during adsorption at state point 10 is rejected external to the heat pump cycle. The advantage and unique feature of this cycle embodiment is that adsorptions occur at two different pressure levels. Gaseous reactant vapor generated to provide cooling at T1 is at pressure P1 and is adsorbed at state points 10, 12, and 15, while the vapor generated to provide cooling at T2 is at pressure P2 and is adsorbed at points 11, 13, and 14. The selection of pressures for the different stages is dependent on the desired or available media, i.e., solid-vapor, liquid-vapor, etc., and on the amount of cooling to be achieved at each temperature level. It is desirable to maximize the number of stages in a cycle while maintaining adequate heat transfer approach temperatures (temperature differentials) for heat exchange between stages. Moreover, more than two temperature and pressure levels may also be used. Heat may be directed between any state point (reaction chamber) and external heat exchange means in order to input or to take advantage of the multiple cooling and heating temperatures of such a system. For example, such a system may be used in cascaded refrigeration, air heating and hot water supply, as well as in applications with cogeneration systems where excess waste heat is available at multiple temperature levels.

A heat pump incorporating multiple heat rejection temperatures, or thermal compressor using multiple delivery pressures, operates in the same manner although some stages of sorption operate below the intermediate pressure level(s). Multiple adsorption and desorption pressures may also be used in a single system.

Although not intended as part of the present invention, the constant pressure staging system may be operated with bivariant media in which the adsorbent vapor pressure is also a function of the refrigerant concentration. Each individual vapor pressure line is replaced by a solution field over which the specific media operates. The resulting system is less practical for use with bivariant solid vapor media, for example zeolites or activated carbon, because solution fields, of reasonable refrigerant concentration spread in the media, are quite wide. Since no overlap of solution fields is acceptable, only a portion of the theoretical solution field and very few stages may be used. Moreover, the large thermal masses and ineffective staging results in low efficiency. Additionally, during shutdown all refrigerant will migrate to the lowest vapor pressure media, further reducing efficiency for cyclic operation. Use of liquid absorbents overcomes some of these bivariant media problems. Each stage of the constant pressure staged cycle would be a narrow concentration range of the media. Media may be pumped from stage to stage such that as it is desorbed and vapor decreased, it moves to a higher temperature stage, and as fluid absorbed refrigerant it moves to a lower temperature stage. Temperature change between stages may be accomplished recuperatively.

What is claimed is:

1. A method of staging solid-vapor compound reactions comprising:
    selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant,
    locating a different one of said compounds in a different one of a plurality reactors,
    in a first reaction cycle, operating a first portion of said reactors at a temperature resulting in a first pressure, whereby said compound therein desorbs said gaseous reactant in an endothermic reaction, and operating said second portion of said reactors at a second pressure whereby said compound therein adsorbs said gaseous reactant in an exothermic reaction, and
    in a second reaction cycle, operating said first portion of said reactors at said second pressure whereby said compound therein adsorbs said gaseous reactant in an exothermic reaction, and operating said second portion of said reactors at a temperature resulting in said first pressure whereby said compound therein desorbs said gaseous reactant in an endothermic reaction, and
    directing gaseous reactant released from said desorbing reactors to a single condensing means for said gaseous reactant, directing condensed gaseous reactant from said single condensing means to a single evaporating means said gaseous reactant, and directing evaporated gaseous reactant from said single evaporating means to adsorbing reactors.

2. The method of claim 1 wherein at least a portion of said heat from an exothermic adsorption reaction is directed to a reactor for heating compounds therein for driving an endothermic desorption reaction.

3. The method of claim 1 including recovering heat from the gaseous reactant condensation.

4. The method of claim 1 including absorbing heat from evaporation of the condensed gaseous reactant.

5. The method of claim 1 wherein external heat is directed to a first reactor of said first portion of reactors in said first cycle for driving an endothermic reaction therein.

6. The method of claim 1 including directing at least a portion of the heat released during said exothermic reactions or at least a portion of the heat absorbed during said endothermic reactions to heat exchange means for energy recovery.

7. The method of claim 1 wherein said gaseous reactant is selected from the group consisting of ammonia, water, carbon dioxide, sulfur dioxide, lower alkanol, alkylamine, polyamine and phosphine.

8. The method of claim 7 wherein said solid reactant is a metal oxide, halide, carbonate, nitrate, nitrite, sulfate, oxalate or sulfide.

9. The method of claim 8 wherein the metal of said inorganic salt is selected from the group consisting of alkali metal, alkaline earth metal, transition metal, aluminum, zinc, cadmium, and tin.

10. The method of claim 8 wherein said solid reactant comprises a double metal chloride, said metals selected from the group consisting of an alkali metal, alkaline earth metal, aluminum, manganese, iron, nickel and cobalt.

11. The method of claim 9 wherein said gaseous reactant is ammonia and said solid reactant is a halide of said metal.

12. The method of claim 1 compromising selecting a plurality of three or more different compounds and locating a different one of said compounds in a different one of three or more different reactors.

13. The method of claim 12 wherein each of said compounds absorb and desorb the same gaseous reactant at different temperature, respectively, at said reaction pressure, and wherein, said plurality of compounds selected are placed in successive reactors in successive ascending order of gas vapor pressure.

14. The method of claim 13 wherein said compounds are selected such that the adsorption temperature of a lower vapor pressure compound at a low reaction pressure, is higher than the desorption temperature of a successive higher vapor pressure compound at a high reaction pressure.

15. The method of claim 14 wherein said first pressure is higher then said second pressure.

16. The method of claim 15 wherein at least a portion of the heat from an exothermic adsorption reaction of a first of said compounds having a lower vapor pressure than a second of said compounds is directed to a reactor containing a compound having the next higher vapor pressure for driving an endothermic desorption reaction thereof.

17. A method of claim 1 including, in said first reaction cycle, pressurizing a third portion of said reactors at a third pressure whereby said compound therein absorbs said gaseous reactant in an exothermic reaction, said second and third pressures being different from one another and less than said first pressure.

18. A method of claim 17 including, in said second reaction cycle, operating said third portion of said reactors at a temperature resulting in said first or second pressure whereby said compound therein desorbs said gaseous reactant in an endothermic reaction.

19. An improved method of staging solid-vapor compound reactions comprising:

selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant, wherein said gaseous reactant is selected from the group consisting of ammonia, water, carbon dioxide, sulfur dioxide, lower alkanol, alkylamine, polyamine and phosphine, and wherein said solid reactant is a metal oxide, halide, carbonate, nitrate, nitrite, sulfate, oxalate or sulfides of a metal selected from the group consisting of alkali metal, alkaline earth metal, transition metal, aluminum, zinc, cadmium, and tin, or a double metal chloride of metals selected from the group consisting of an alkali metal alkaline earth metal, aluminum, manganese, iron, nickel and cobalt, locating a different one of said compounds in a different one of a plurality of reactors, in a first reaction cycle, operating a first portion of said reactors at a temperature resulting in a first pressure, whereby said compound therein desorbs said gaseous reactant in an endothermic reaction and directing the desorbed gaseous reactant to receiving means for adsorbing said gaseous reactant, and operating said second portion of said reactors at a second pressure, lower than said first pressure, and directing gaseous reactant from receiving means thereto whereby said compound therein adsorbs said gaseous reactant in an exothermic reaction, and in a second reaction cycle, operating said first portion of said reactors at said second pressure and directing gaseous reactant from receiving means thereto whereby said compound therein adsorbs said gaseous reactant in an exothermic reaction and operating said second portion of said reactors at a temperature resulting in said first pressure whereby said compounds therein desorb said gaseous reactant in and endothermic reaction, and directing said desorbed gaseous reactant to receiving means for adsorbing said gaseous reactant.

20. The method of claim 19 comprising selecting said plurality of compounds such that each of said compounds adsorb and desorb the same gaseous reactant at different temperatures, respectively, at said reaction pressures.

21. The method of claim 20 comprising locating said compounds into successive reactors in successive ascending order of gas vapor pressure.

22. The method of claim 21 wherein said compounds are selected such that the adsorption temperature of a lower vapor pressure compound at a low reaction pressure, is higher than the desorption temperature the next successive higher vapor pressure compound at a high reaction pressure.

23. A method of claim 19 including, in said first reaction cycle, pressurizing a third portion of said reactors at a third pressure whereby said compound therein absorbs said gaseous reactant is an exothermic reaction, said second and third pressures being different from one another and less than said first pressure.

24. A method of claim 23 including, in said second reaction cycle, operating said third portion of said reactors at a temperature resulting in a first or second pressure whereby said compound therein desorbs said gaseous reactant in an endothermic reaction.

25. The method of claim 19 comprising directing at least a portion of the heat released from said exothermic adsorption reaction to a reactor for heating compounds therein for driving an endothermic desorption reaction.

26. An improved method of staging solid-vapor compound reactions comprising:

selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant, wherein said gaseous reactant is selected from the group consisting of ammonia, water, carbon dioxide, sulfur dioxide, lower alkanol, alkylamine, polyamine and phosphine, and wherein said solid reactant is a metal oxide, halide, carbonate, nitrate, nitrate, sulfate, oxalate or sulfide of a metal selected from the group consisting of alkali methal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt, locating a different one of said compounds in a different one of a plurality reactors, in a first reaction cycle, operating a first position of said reactors at a temperature resulting in a first pressure, whereby said compound therein desorbs said gaseous reactant at said pressure in an endothermic reaction and directing the desorbed gaseous reactant to a condenser and operating said second portion of said reactors at a second pressure, lower than said first pressure, and directing gaseous reactant from an evaporator thereto whereby said compound therein adsorbs said gaseous reactant in an exothermic reaction, in a second reaction cycle, operating said first portion of said reactors at said second pressure and directing gaseous reactant from said evaporator thereto whereby said compound therein adsorbs said gaseous reactant in an exothermic reaction, and operating said second portion of said reactors at a temperature resulting in said first pressure whereby said compounds therein desorb said gaseous reactant in an endothermic reaction and directing said desorbed gaseous reactant to said condenser, and directing said gaseous reactant from said condenser to said evaporator during said first and second reaction cycles, respectively.

27. The method of claim 26 comprising selecting said plurality of compounds such that each of said compounds adsorb and desorb the same gaseous reactant at different temperatures, respectively, at said reaction pressures.

28. The method of claim 27 comprising locating said compounds into successive reactors in successive ascending order of gas vapor pressure.

29. The method of claim 28 wherein said compounds are selected such that the adsorption temperature of a lower vapor pressure compound at a low reaction pressure, is higher than the desorption temperature at the next successive higher vapor pressure compound at a high reaction pressure.

30. A method of claim 26 including, in said first reaction cycle, pressurizing a third portion of said reactors at a third pressure whereby said compound therein adsorbs said gaseous reactant in an exothermic reaction, said second and third pressures being different from one another and less than said first pressure.

31. A method of claim 30 including, in said second reaction cycle, operating said third portion of said reactors at a temperature resulting in said first or second pressure whereby said compound therein desorbs said gaseous reactant in an endothermic reaction.

32. The method of claim 26 comprising directing at least a portion of the heat released from said exothermic adsorption reaction to a reactor for heating compounds therein for driving an endothermic desorption reaction.

33. An improved method of operating a mechanical or pressure driven heat pump or refrigeration system comprising:
selecting a plurality of two or more different compounds comprising a solid reactant adsorbent and a gaseous reactant absorbed thereon, wherein each of said complex compounds has a different gaseous reactant vapor pressure, substantially independent of the concentration of the gaseous reactant,
locating a different one of said compounds in a different one of a plurality of reactors,
in a first reaction cycle, pressurizing a first portion of said reactors at a first pressure, whereby said compound therein desorbs said gaseous reactant at said first pressure in an endothermic reaction, and pressurizing said second portion of said reactors at a second pressure, higher than said first pressure, whereby said compound therein adsorbs said gaseous reactant at said second pressure in an exothermic reaction, and
in a second reaction cycle, pressurizing said first portion of said reactors at said second pressure whereby said compound therein adsorbs said gaseous reactant at said second pressure in an exothermic reaction, and pressurizing said second portion of said reactors at said first pressure whereby said compounds therein desorb said gaseous reactant at said first pressure in an endothermic reaction, and
directing at least a portion of the heat released from said exothermic adsorption reaction to a reactor for heating compounds therein for driving an endothermic desorption reaction.

34. The method of claim 33 comprising selecting said plurality of compounds such that each of said compounds adsorb and desorb the same gaseous reactant at different temperatures, respectively, at said reaction pressures.

35. The method of claim 34 comprising introducing said compounds into successive reactors in successive ascending order of adsorption temperature at the same adsorption pressure.

36. The method of claim 35 wherein said compounds are selected such that the adsorption temperature of a compound, at adsorption pressure, is higher than the desorption temperature of the next lower vapor pressure compound, at desorption pressure.

37. A method of claim 33 including, in said first reaction cycle, pressurizing a third portion of said reactors at a thrid pressure whereby said compound therein adsorbs said gaseous reactant in an exothermic reaction, said second and third pressures being different from one another and greater than said first pressure.

38. A method of claim 37 including, in said second reaction cycle, pressurizing said third portion of said reactors at said first or second pressure whereby said compound therein desorbs said gaseous reactant in an endothermic reaction.

39. An apparatus comprising:
a plurality of two or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, lower alkane, alkylamine, polyamine and phosphine and said solid reactant is an inorganic salt selected from the group consisting of a metal oxide, halide, carbonate, oxalate, nitrate, nitrite, sulfite, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt,
heating means for introducing heat into at least one of said chambers, means for directing heat transfer fluid to and from said reaction chambers, and heat exchange means for selectively recovering and/or absorbing heat from said reaction chambers, and
a condenser, an evaporator, conduit means for directing gaseous reactant from each of said reaction chambers to said condenser, and conduit means for directing gaseous reactant from said evaporator to each of said reaction chambers.

40. An apparatus comprising:
a plurality of two or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, lower alkane, alkylamine, polyamine and phosphine and said solid reactant is an inorganic salt selected from the group consisting of a metal oxide, halide, carbonate, oxalate, nitrate, nitrite, sulfite, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt,
heating means for introducing heat into at least one of said chambers, means for directing heat transfer fluid to and from said reaction chambers, and heat exchange means for selectively recovering and/or absorbing heat from said reaction chambers, and
receiving means for adsorbing and desorbing said gaseous reactant.

41. Apparatus of claim 40 wherein said receiving means comprises reactors containing a solid adsorbent or liquid absorbent composition.

42. An apparatus comprising:
a plurality of two or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, lower alkane, alkylamine, polyamine and phosphine and said solid reactant is an inorganic salt selected from the group consisting of a metal oxide, halide, carbonate, oxalate, nitrate, nitrite, sulfite, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt, heating means for introducing heat into at least one of said chambers, means for directing heat transfer fluid to and from said reaction chambers, and heat exchange means for selectively recovering and/or absorbing heat from said reaction chambers, and a pressure activated heat pump for receiving gaseous reactant directed from said chambers.

43. Apparatus of claim 42 wherein said pressure activated heat pump comprises a plurality of two or more reaction sites each having a different compound therein comprising a solid reactant adsorbent and a gaseous reactant adsorbed thereon, each of said compounds having a different gaseous reactant vapor pressure, substantially independent of the concentration of the gaseous reactant therein.

44. Apparatus of claim 43 wherein said compounds have an ascending order of gaseous reactant vapor pressure with the absorption temperature of a compound at a high reaction pressure being higher than the desorption temperature of the next successive lower vapor pressure compound at a low reaction pressure.

45. A heat activated heat pump apparatus comprising:

a plurality of three or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, said compounds having an ascending order of gaseous reactant vapor pressure with the adsorption temperature of a lower vapor pressure compound at a low reaction pressure being higher than the desorption temperature of the next successive higher vapor pressure compound at a high reaction pressure, wherein said gaseous reactant is selected from the group consisting of ammonia, water, carbon dioxide, sulfur dioxide, lower alkanol, lower alkane, alkylamine, polyamine and phosphine and said solid reactant is an inorganic salt selected from the group consisting of a metal oxide, halide, carbonate, oxalate, nitrate, nitrite, sulfite and sulfate, wherein said metal is selected from the group consisting of alkali metal, alkaline earth metal, transition metal, aluminum, zinc, cadmium, and tin, or solid salt comprising a double metal chloride of metals selected from the group consisting of al alkali metal, alkaline earth metal, aluminum, manganese, iron, nickel and cobalt.

46. Apparatus of claim 45 including means for directing heat from an adsorption reaction chamber to a desorption reaction chamber.

47. Apparatus of claim 45 including means for directing heat between reaction chambers and external heat exchange means.

48. A mechanical or pressure actuated heat pump apparatus comprising:

a plurality of two or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, said compounds having an ascending order of adsorption, temperatures at the same adsorption and desorption pressure, respectively, and wherein the lower adsorption temperature compound adsorption temperature at high reaction pressure is higher than the desorption temperature of the next successive higher adsorption temperature compound at low reaction pressure wherein said gaseous reactant is selected from the group consisting of ammonia, water, carbon dioxide, sulfur dioxide, lower alkanol, lower alkane, alkylamine, polyamine and phosphine and said solid reactant is an inorganic salt selected from the group consisting of a metal oxide, halide, carbonate, oxalate, nitrate, nitrite, sulfite and sulfate, wherein said metal is selected from the group consisting of alkali metal, alkaline earth metal, transition metal, aluminum, zinc, cadmium, and tin, or solid salt comprising a double metal chloride of metals selected from the group consisting of an alkali metal, alkaline earth metal, aluminum, manganese, iron, nickel and cobalt.

49. Apparatus of claim 48 including means for directing heat from an adsorption reaction chamber to a desorption reaction chamber.

50. Apparatus of claim 48 including means for directing heat between adsorption reaction chambers and external heat exchange means.

51. Apparatus of claim 48 including means for directing heat between desorption reaction chambers and external heat exchange means.

* * * * *